US009524035B2

(12) United States Patent
Xiong et al.

(10) Patent No.: US 9,524,035 B2
(45) Date of Patent: Dec. 20, 2016

(54) METHOD AND DEVICE FOR CHARACTER INPUT BY DIRECTION KEY

(75) Inventors: Yuqian Xiong, Fujian (CN); Hang Wang, Fujian (CN)

(73) Assignee: FOXIT CORPORATION, Fujian (CN)

(*) Notice: Subject to any disclaimer, the term of this patent is extended or adjusted under 35 U.S.C. 154(b) by 914 days.

(21) Appl. No.: 13/511,372

(22) PCT Filed: Dec. 17, 2009

(86) PCT No.: PCT/CN2009/001485
§ 371 (c)(1),
(2), (4) Date: May 23, 2012

(87) PCT Pub. No.: WO2011/063555
PCT Pub. Date: Jun. 3, 2011

(65) Prior Publication Data
US 2012/0235838 A1    Sep. 20, 2012

(30) Foreign Application Priority Data

Nov. 25, 2009  (CN) .......................... 2009 1 0237905

(51) Int. Cl.
*H03K 17/94*   (2006.01)
*H03M 11/00*   (2006.01)
*G06F 3/023*   (2006.01)

(52) U.S. Cl.
CPC .................. *G06F 3/0234* (2013.01)

(58) Field of Classification Search
CPC ........ H03K 17/94; H04M 11/00; G06F 3/018; G06F 3/0237; G06F 3/0233; G06F 3/023; G06F 3/0234; G06F 3/0236
USPC ............................................... 341/20, 21, 28
See application file for complete search history.

(56) References Cited

U.S. PATENT DOCUMENTS

| | | | | |
|---|---|---|---|---|
| 5,486,823 A | * | 1/1996 | Tsai ...................... | G06F 3/0235 341/20 |
| 5,717,425 A | * | 2/1998 | Sasaki .................. | G06F 3/0236 345/157 |
| 6,016,142 A | * | 1/2000 | Chang et al. ................. | 715/763 |

(Continued)

FOREIGN PATENT DOCUMENTS

| | | |
|---|---|---|
| CN | 1344092 A | 4/2002 |
| CN | 1638038 A | 9/2006 |
| CN | 101362840 A | 3/2009 |

*Primary Examiner* — Amine Benlagsir
*Assistant Examiner* — Son M Tang
(74) *Attorney, Agent, or Firm* — Soroker Agmon Nordman

(57) ABSTRACT

A method and a device for character input by direction key are disclosed. The method comprises: a mapping relation between characters in input character set and direction key input sequences is constructed, and at least a code table representing the mapping relation is established; the character is inputted by a code table selection key and a direction key, the character input comprises the following steps: a code table as a current code table is determined according to the input of a code table selection key (S10); a prompting message of the current code table is displayed on a display screen (S20); an input character is determined in the current code table according to a direction key input sequence (S30). The used direction key, the confirmation key and the code table selection key are based on an existing key of an existing e-book reader, media player and other electronic devices.

13 Claims, 8 Drawing Sheets

(56) References Cited

U.S. PATENT DOCUMENTS

| | | | |
|---|---|---|---|
| 6,271,835 B1 * | 8/2001 | Hoeksma | G06F 3/04886 345/168 |
| 6,320,942 B1 * | 11/2001 | Chang | 379/93.27 |
| 6,567,072 B2 * | 5/2003 | Watanabe | 345/161 |
| 6,822,585 B1 * | 11/2004 | Ni | G06F 3/0237 341/22 |
| 6,848,080 B1 * | 1/2005 | Lee | G06F 17/2223 704/9 |
| 6,897,849 B2 * | 5/2005 | Kim | 345/160 |
| 7,162,694 B2 * | 1/2007 | Venolia | 715/210 |
| 7,530,031 B2 * | 5/2009 | Iwamura et al. | 715/864 |
| 7,580,829 B2 * | 8/2009 | James et al. | 704/2 |
| 7,649,478 B1 * | 1/2010 | Yoon | 341/22 |
| 7,800,587 B2 * | 9/2010 | Kato | G06F 3/0236 345/168 |
| 7,911,363 B2 * | 3/2011 | Jeon | 341/22 |
| 8,902,169 B2 * | 12/2014 | Heo | G06F 3/0482 345/169 |
| 2001/0006587 A1 * | 7/2001 | Keinonen | G06F 3/0234 400/472 |
| 2002/0054135 A1 * | 5/2002 | Noguchi et al. | 345/788 |
| 2002/0174100 A1 * | 11/2002 | Daray | G06F 7/08 |
| 2003/0169188 A1 * | 9/2003 | Chang | 341/22 |
| 2006/0061491 A1 * | 3/2006 | Qin | G06F 3/0233 341/28 |
| 2006/0202865 A1 * | 9/2006 | Nguyen | 341/22 |
| 2007/0171097 A1 * | 7/2007 | Jeon | 341/22 |
| 2007/0229312 A1 * | 10/2007 | Park | G06F 3/018 341/22 |
| 2007/0294636 A1 * | 12/2007 | Sullivan | 715/810 |
| 2008/0072143 A1 * | 3/2008 | Assadollahi | 715/261 |
| 2008/0158162 A1 * | 7/2008 | Ahn | G06F 3/0233 345/168 |
| 2008/0165035 A1 * | 7/2008 | Bhella | G06F 3/0238 341/23 |
| 2009/0077039 A1 * | 3/2009 | Narahara | G06F 3/0236 |
| 2009/0199085 A1 * | 8/2009 | Park | G06F 17/30905 715/234 |
| 2010/0231503 A1 * | 9/2010 | Senda | 345/156 |
| 2011/0169731 A1 * | 7/2011 | Takenaka et al. | 345/157 |
| 2015/0253870 A1 * | 9/2015 | Ikeda | G06F 3/0233 345/158 |

* cited by examiner

METHOD AND DEVICE FOR CHARACTER INPUT BY DIRECTION KEY

TECHNICAL FIELD

The invention, relates to text input in an electronic device, and more particularly, to a method for object input by keys, especially to a method for character input by arrow keys.

BACKGROUND

Text input of electronic devices mainly can be divided into two classes, namely handwriting input and keyboard input, while some devices can support input by touching touch screen to select, which is substantially using the screen area as a virtual keyboard, and is also an idea of keyboard input. For keyboard input, inputting by a standard full keyboard, such as a computer keyboard, a PDA keyboard or a smartphone keyboard, can be considered as the most feature-complete keyboard. However, a full keyboard requires large space, and then it has some limits in using. Therefore, many input methods have been developed with keyboards with limited keys, wherein a method for text input with a digital 12 key 4-by-3 keypad is most typical. With the popularity of phone products, methods for text input with keypads have been developed dramatically. Unfortunately, there has never been a better solution to reduce key ambiguity. On average, the keys almost have to be pressed for three times to input a character when the input object is not a morpheme but a character (Morpheme here stands for an ideographic linguistic unit, e, g. "字" in Chinese or "word" in English.)

Some devices with limited panel space, like e-book readers, and media players such as MP3, and MP4, usually are equipped with some arrow keys and a confirmation key and without numerical keys. Even more, a computer is needed to connect with said devices for text input by the computer, which is quite inconvenient. For example, people may need to add some bookmarks annotations while they are reading the e-books, in this case, it is quite essential to using the readers for text input. As we know, the full keyboard is a solution to this problem, as Kindle reader, the best seller produced by Amazon, is mostly equipped with a full keyboard. However, the full keyboard has its own limits—occupying more space, which would need to increase the size of reader or decrease the size of screen. What's worse, the corresponding devices including hardware such as a key scanning circuit and an inputting keyboard will cost amore. An ideal product allows inputting text directly by a few keys, such as arrow keys base on the existent product. As a matter of fact, such inputting method doesn't exist in existent technologies.

The PCT application, with publication number of WO2006073273A1, title of "Method and apparatus for inputting character through direction input unit", relates a input method having direction buttons. With this method, a mapping relationship between the sequence of the keys of the direction buttons and the keys of a 12-key 4-by-3 keypad is established to input by the direction buttons. For example, the sequence of any two direction buttons corresponds to one of the keys of 12-key keypad. In fact, this method is still based on the mapping relationship between the existing keypad and the corresponding character input. The difference is to establish the corresponding relationship between the direction buttons and the keypad. Therefore, for a character to input, if the average number of keystrokes by the keypad is 3, and then, the method mentioned in this PCT application will doubles the number of the times of pressing keys. So, the efficiency of this method is not high. What further affects of the use of this method is the requirement for user's good memory on the corresponding relationship between the characters of the keypads and the direction button sequences, which is quite inconvenient to ordinary users.

The U.S. Pat. No. 6,567,072, named as "Character input device and method", discloses a character input method having a direction indicating device, a key input means and a display screen. Wherein the direction indicating device works as a rotation plate for outputting the inclination angle and its force; a control means receives radial and circumferential position information output by the direction indicating device; the screen displays depending on the radial information and the corresponding relationship between the output stored in it and the character sets; then, a single character in the character set displayed on the screen is selected depending on the circumferential information; finally, the selected character is determined by the input of the key input means. However, this input method has higher demand on the direction indicating device, which not only can locate a plurality of directions on the circumference, but also can locate different radius on every circumference. Such requirements make its structure more complicated, and at the same time, it leads to a higher hardware cost and lower durability. Obviously, this method does not make universal performance for existing ordinary key pressing device.

Hence, the current technology on input device and method is inapplicable to electronic devices for text input with a few key buttons, such as e-hook, MP3 and MP4.

SUMMARY OF THE INVENTION

The object of the present invention is to provide a device and method for text input by fewer keys, e.g., only 4 arrow keys. It can simplify the structure of the devices, even without making changes based on the existing hardware. What's more, this method overcomes the defects that many keystrokes are needed to input a single character aroused by decreasing the number of the keys in the prior art.

To achieve this object, this present invention provides a method for character input with arrow keys. In this method, first of all, a mapping relationship between characters in the input character set and sequence of arrow keys input is constructed; and at least one code table is established to indicate said mapping relationship; and then, a character is input by code table selection keys and arrow keys, the method for character input comprises the following steps:

S10 : to determine the current code table according to the input of the code table selection keys;

S20 : to display the prompt message of the current code table on the display screen;

S30 : to determine the character input in the current code table according to the sequence of arrow keys input.

The step S30 further comprises the following steps:

S31 : to select a current character in the current code table according to the sequence of arrow keys input.

S35 : to judge whether the selecting condition is satisfied. If yes, go forward to the step of S39 ; if no, go back to the step of S31, S39 : to confirm the current character as the character input Wherein the selecting condition is that the sequence of arrow keys input is saturated; wherein the "saturated" means that the sequence of arrow keys input already reaches the given length and the sequence of arrow keys input has a corresponding character in the current code table. Or the method further comprises using a confirmation key, taking pressing the confirmation key down as a selecting condition in the step of S35.

According to another embodiment of this invention, the present invention also provides another method for character input by arrow keys. Similarly, a mapping relationship between characters in an input character set and the sequence of arrow keys input is constructed, and at least one code table is established to indicate said mapping relationship; a characters is input by code table selection keys, arrow keys and a confirmation key, the method for character input comprises the following steps:

P10): to detect whether there is any new key input; if no, keep on waiting; if yes, go to the next step;

P20): to judge the type of the key input and execute the following operations respectively according to the type:

when code table selection keys are input, to switch the current code table according to the key input and control the display screen to display the prompt message of the current code table, then go back to the step of P10;

when a arrow key is input, to recognize the key-value of the arrow key input and update the sequence of arrow keys input accordingly; to select a current character in the current code table according to the sequence of arrow keys input and then go back to the step of P10;

when the Confirmation key is input, to confirm that the current character is the character input and finish inputting one character.

Preferably, in the step of P20 ; when a arrow key is input, the method further comprises the step to judge whether the sequence of arrow keys input is saturated after updating the sequence of arrow keys input and determining the current character; if no go back to P10 , if yes, to confirm that the current character is the character input and finish inputting one character; wherein, the "saturated" means that the sequence of arrow keys input reaches the given length and the sequence of arrow keys input has a corresponding character in the current code table.

Preferably, the number of the arrow keys is 4; the sequence of arrow keys input has at most 3 elements.

Preferably, the mapping relationship between the characters in the input character set and the sequence of arrow keys input is that: the characters in the input character set is distributed over every code table; that every character in every code table is assigned a different code value C; that for every code table, different sequences of arrow keys input correspond to different code values C.

Preferably, the corresponding relationship between the sequence of arrow keys input and the code value C in every code table is: if the i-th arrow key is assigned a key-value Si, the row vector S that consist of key-values of the keys in the sequence of arrow keys input has a linear relationship with the code value C: $C=S \times B^T$, wherein B is the coefficient vector of the corresponding dimension.

At the same time, the present invention further provides a device for character input by arrow keys. The device comprises a character input module and a group of keys input, a display screen and a memory that communicate with the character input module; wherein, the group of keys input comprises at least one code table selection key, a plurality of arrow keys and at least one confirmation key; the content to control the display screen and the character input module to execute the above-mentioned method is stored in the memory.

Depending on another embodiment of the present invention, it provides a device for character input by arrow keys. The device comprises a character input module and a group of keys input, a display screen and a memory that communicate with the character input module; wherein, the group of keys input comprises at least one code table selection key, a plurality of arrow keys and at least one confirmation key; a mapping relationship between characters in an input character set and the sequence of arrow keys input and at least one code table to indicate said mapping relationship are stored in the memory; and the character input module comprises:

a key recognition unit used to receive the key input and recognize which key is pressed;

an input judgment unit to judge the type of the key input;

an analysis processing unit to execute the corresponding operation according to the type of the key input; wherein, when code table selection keys are input, the current code table is switched according to the key input and the prompt message of the current code table is sent to a display control unit; when a arrow key is input, the key-value of the arrow key input is recognized, the sequence of arrow keys input is hereby updated and a current character is determined in the current code table according to the sequence of arrow keys input; when a confirmation key is input, it is confirmed that the current character is the character input, and the character input is sent to a character input temporary memory unit;

the display control unit used to control the display screen to display correspondingly according to the received message;

the character input temporary memory unit used to store the confirmed character input.

The advantages of the invention are: (1) implementing a large amount of character input with a quite small quantity of keys, which can reduce space, compared with full keyboard or numeric keyboard, and can simplify the structure of electronic device. (2) The method for input of the present invention provides simple steps, which can implement character input with fewer keystrokes. (3) All of the arrow keys and the confirmation key used in the present invention are on the basis of the existing keys of existing electronic devices such as e-books and media players. Thus, the invention can be implemented almost without changing the structure of the hardware. Therefore, it is quite universal. (4) The process of character input goes together with the prompt message on the screen, which makes the method easy to be mastered and makes the complicated memory of the users unnecessary. What's more, maintaining the position of the prompt message in the code table consistent with the position of the key in the standard keyboard will be more in accordance with the psychological habit of the users.

DETAILED DESCRIPTION

First of all, it's important to note that the "arrow keys" in the claims and the specification of the present invention not only means the keys of four directions (left, right, up and down), but also refers to other keys which comprise any four keys or other keys of any number. For example, the present invention can be implemented by four keys no matter if it is named as A, B, C, D or 1,2,3,4. Using four arrow keys is just a preferred embodiment of the present invention, which is easy to be directly applied to the existing electronic readers or media players such as MP3, and MP4. Obviously, it can be complemented by arrow keys with the number of less or more than four. The number of arrow keys can be flexibly determined according to the desired character to input and required keystrokes to input a single character doubtlessly.

The communication connection mentioned in the present invention includes direct information interaction between two devices or indirect information interaction via the third intermediate device, or any method of connection for information interaction between any two devices.

Figure 1:
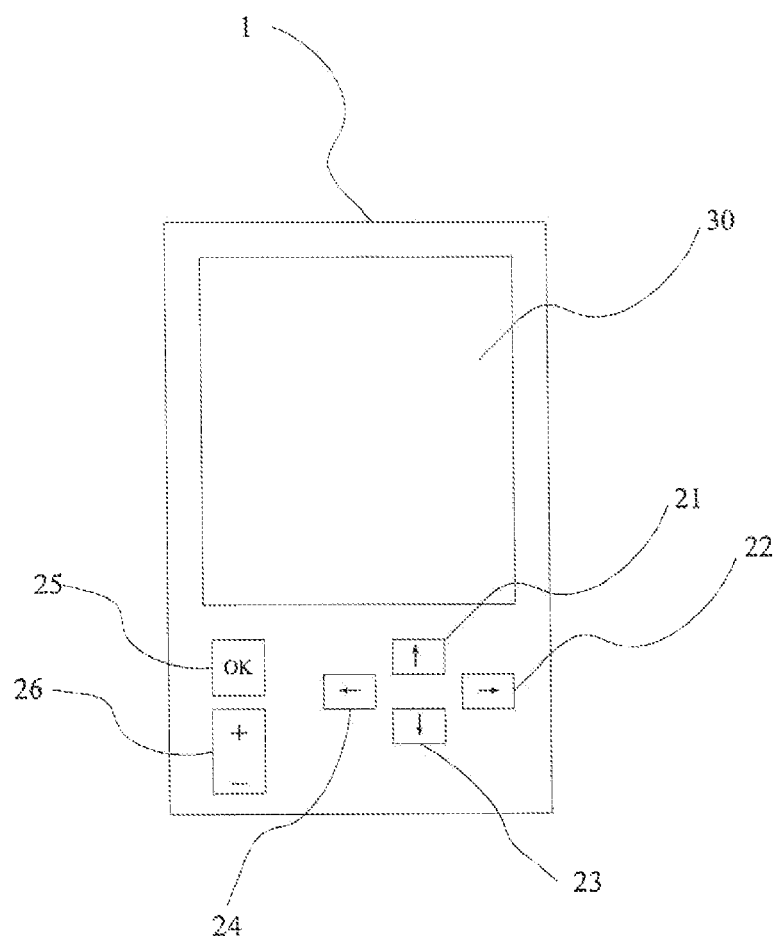
FIG. 1 is an external structure view illustrating an embodiment of the device of the present invention for character input by arrow keys.
Figure 2:
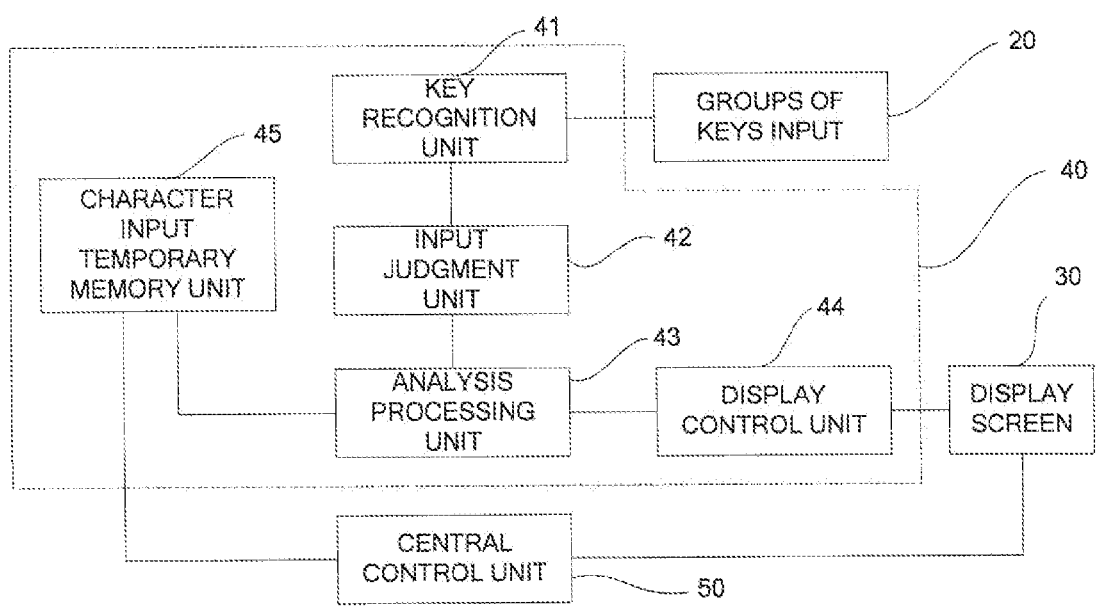
FIG. 2 is a structure module view illustrating an embodiment of the device of the present invention for character input by arrow keys.

FIG. 1 and FIG. 2 respectively illustrate an external structure view and a structure module view of an embodiment of the device of the present invention for character input by arrow keys. Wherein, the electronic device 1 as illustrated includes: a display screen 30, a group of keys input 20 and a control module. Wherein, the group of keys input 20 includes a confirmation key 25, code table selection keys 26 and four arrow key 21, 22, 23, 24, e.g., which respectively stands for one of four directions (left, right, up and down). Wherein, when there is only a small quantity of characters to input and thereby there is only one code table which do not need switching, the code table selection key 26 is not necessary. Preferably, the code table selection keys 26 should perform bi-directional switching function, i.e., the code table can be controlled to switch by scrolling pages in the forward direction and in the backward direction. That is the reason why the keys with the bi-directional selection function is regarded as preferable implementation. Of course, two code table selection keys can be set to respectively correspond to the switching of two directions, or only one unidirectional control code table to be set for circular switching.

Obviously, the keyboard and the display screen of the devices as illustrated by FIG. 1 can respectively be implemented on the hardware of existing electronic e-books readers or media players such as MP3 or MP4. Both the arrow keys and the confirmation key are existing, while the code table selection keys can be implemented by keys for page scrolling or be implemented by keys for volume adjustment.

The portion of the Control circuit may include a character input module 40 and a central control unit 50. Wherein the character input module 40 is used for character input and the central control unit 50 controls every function of the electronic device. It is to illustrate that the division of the modules or the units here is functional or logical, and every unit is not necessarily implemented by separated hardware component. And, the embodiment of FIG. 2 just illustrates the character input control of the electronic device 1, but does not explain that the reuse of other keys and functions involved in the character input of the electronic device 1. Those skilled in the art can blend the method and device for input by arrow keys of the present invention with any other corresponding hardware device and function.

The character input module 40 includes a key recognition unit 41, an input judgment unit 42, an analysis processing unit 43, a display control unit 44 and a character input temporary memory unit 45. Wherein, the key recognition unit 41 is communication connected with a plurality of groups of keys input 20 for receiving the key input, then converting it to corresponding key-value and the message input will be sent to the input judgment unit 42; the input judgment unit 42 judge the type of the key input, and different type of the key will respectively correspond to different following operation. The analysis processing unit 43 will correspondingly compute and process on the basis of the type of the key input, and confirm the character input and determine the prompt message to be displayed by the display screen 30, and so on. Then prompt message for input to be displayed is sent to the display control unit 44. The display control unit 44, which has communication connection with the display screen 30, controls the display screen 30 to display the prompt message for input.

Wherein, in the analysis processing unit 43, when the code table selection keys are input, the current code table is switched according to the key input, and the prompt message of the current code table is sent to the display control unit 44; when an arrow key is input, the key-value of the arrow key input is recognized, and the sequence of arrow keys input is hereby updated and a current character is determined in the current code table according to the sequence of arrow keys input; when the confirmation key is input, it is confirmed that the current character is the character input, and the character input is sent to a character input temporary memory unit 45.

the character input that is determined by the analysis processing unit 43 is placed into the character input temporary memory unit 45, and is further sent to the central control unit 50 for executing corresponding functions, e.g., modifying the file name and adding annotation. At the same time, the central control unit can also control the area of the character input of the display screen 30 to display the character input.

In the device of the present invention, the functions of the character input module 40 and the central control unit 50 can be realized by a microprocessor and a memory, wherein programs stored in the memory can control the microprocessor to execute the program with the function of each above unit. For the specific content in the operation process that the programs stored in the memory can control the microprocessor to execute, please see the following detailed description accompanying the drawings FIG. 3-9.

The flow charts of the method of the present invention for character input by arrow keys are as illustrated in FIG. 3. The key point is to construct a mapping relationship between a sequence S of arrow keys input with more keystrokes and a code value C of the character intended to input: $\Re$ (S, C):S→C, and then, the mapping relationship is indicated in the form of a code table to display the prompt message for input, which facilitates users to input the sequence of the keys by referring to the prompt message displayed in the code table; and afterwards, the corresponding character input is determined on the basis of the sequence of arrow keys input by the users and the code table. For example, if there are m arrow keys, and the maximum keystroke of arrow keys to input each character is k, $m^K$ characters can be represented in the way of one-to-one mapping. To facilitate the reading of the prompt message, it is preferable to divide the code table into a plurality of code tables, wherein, every code table can be displayed on a screen correspondingly, and the number of the characters included in every code table should be no more than $m^K$ The characters with the number of more than $m^K$ can be displayed by the construction of a plurality of code tables.

Figure 3A:
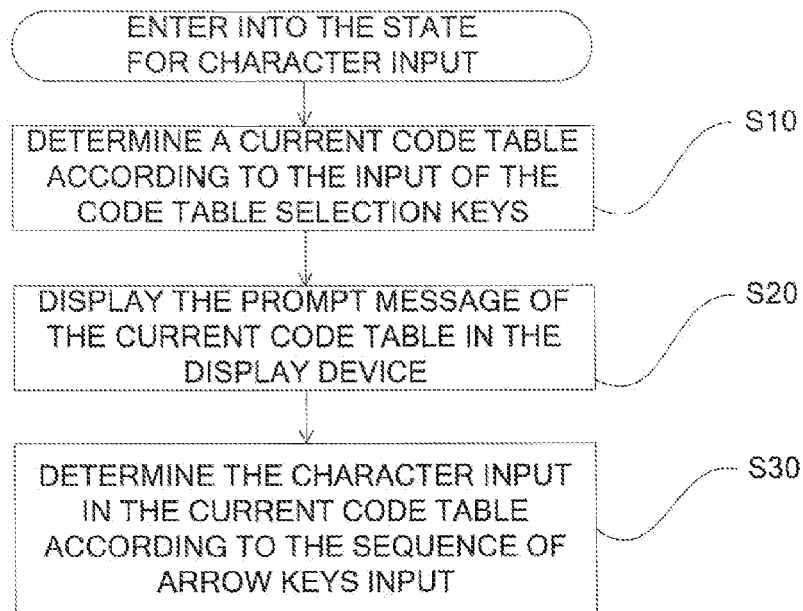
FIG. 3A is an flow chart of one embodiment of the method of the present invention for character input by arrow keys.
Figure 3B:
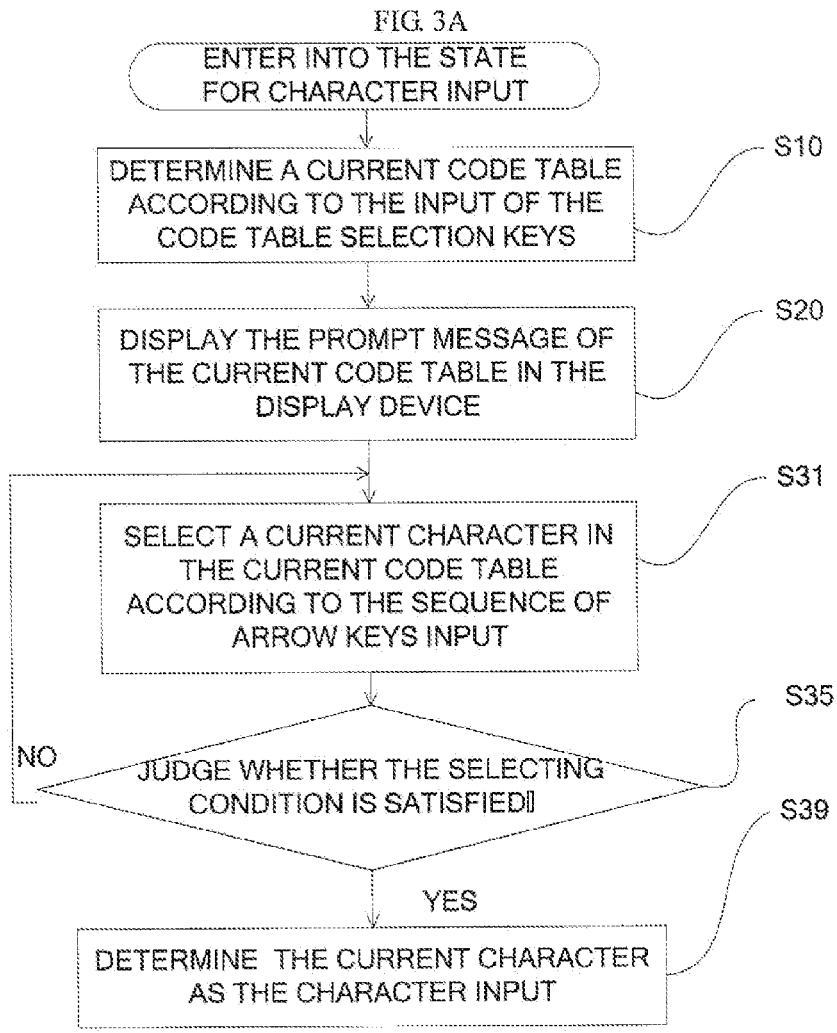
FIG. 3B is an flow chart of another embodiment of the method of the present invention for character input by arrow keys.
Figure 9:
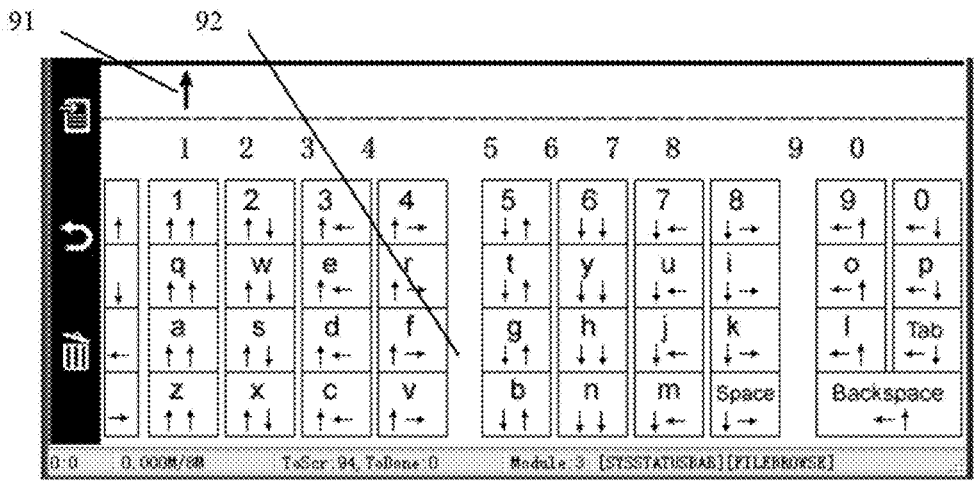
FIG. 9 is a display interface illustrating an embodiment of the present invention.

See FIGS. 3A, 3B. When the electronic device enters into the state for character input, firstly; a current code table is determined according to the input of the code table selection keys (step S10). If a code table selection keys have not been pressed down, the first code table or the code table recently used could be taken as the default of the current code table. And if there is only one code table, the step can be skipped. And then, the prompt message of the current code table is displayed on the display screen (step S20), as illustrated in FIG. 9. The prompt message of the code table could be displayed in the form of tables to show respectively the characters output corresponding to the sequence of arrow keys input. Users can input the corresponding sequence of arrow keys input according to the prompt message, and the electronic device will determine the character input in the current table according to the sequence of arrow keys input (step S30).

See FIG. 3B, the method for determining the character input is: firstly, to select the current character in the current code table according to sequence of arrow keys input (Step S31), in this step, the current character to select will be changed with the sequence S of arrow keys input, and thus the position of the current character will be changed accordingly in the prompt message on the display screen. Then, judge whether the selecting condition is satisfied (Step S35); if it is not satisfied, go back to Step S31, and keep on waiting the following input to change the sequence of arrow keys input to satisfy the selecting condition. If yes, confirm the current character as the character input accordingly (Step S39). Wherein, the selecting condition can be that the confirmation key is pressed down, or that the character is output when the sequence of arrow keys input has reach given saturated length. Once the character input has been confirmed, finish inputting the current character. And then, the input of the next character is restarted.

Wherein the "saturated" means that the sequence of arrow keys input already reaches the given length and the sequence of arrow keys input has a corresponding character in the current code table. More detailed explanation to the "saturated", is in the following text.

It is taken as an example in the following to explain the method of the present invention for input in detail that four arrow keys control the input of 95 visible characters in ASCII code. Obviously, those skilled in the art can select the desired characters to input and establish different code tables based on their own requirements. According to demands for different languages, for instance, characters such as hiragana or katakana in Japanese, or characters of different languages such as French, Russian, and Latin can be set.

Figure 4:
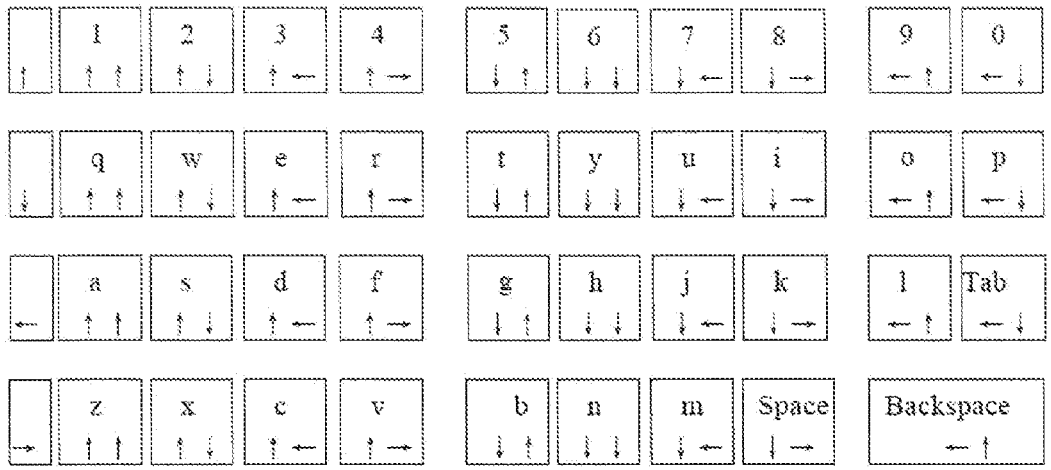
FIG. 4 shows Code Table 1 of the embodiment of the method of the present invention for character input by arrow keys.
Figure 5:
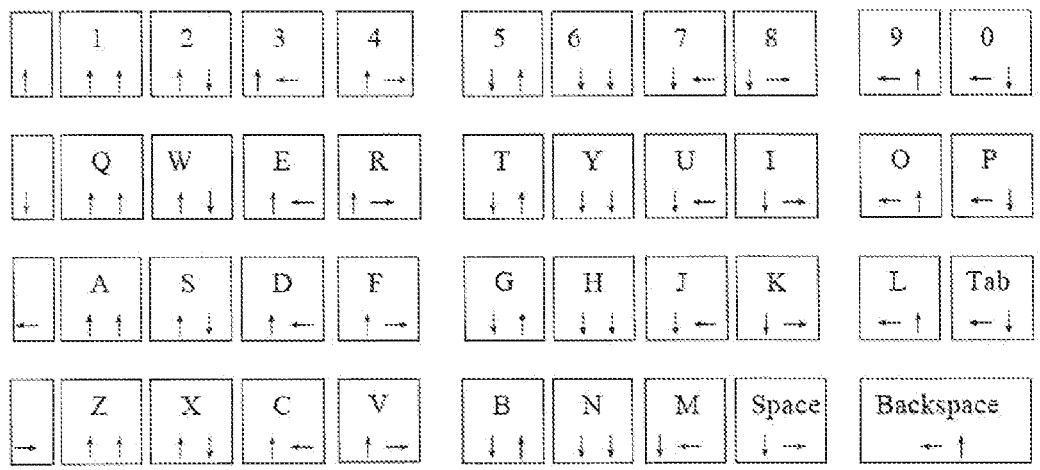
FIG. 5 shows Code Table 2 of the embodiment of the method of the present invention for character input by arrow keys.
Figure 6:
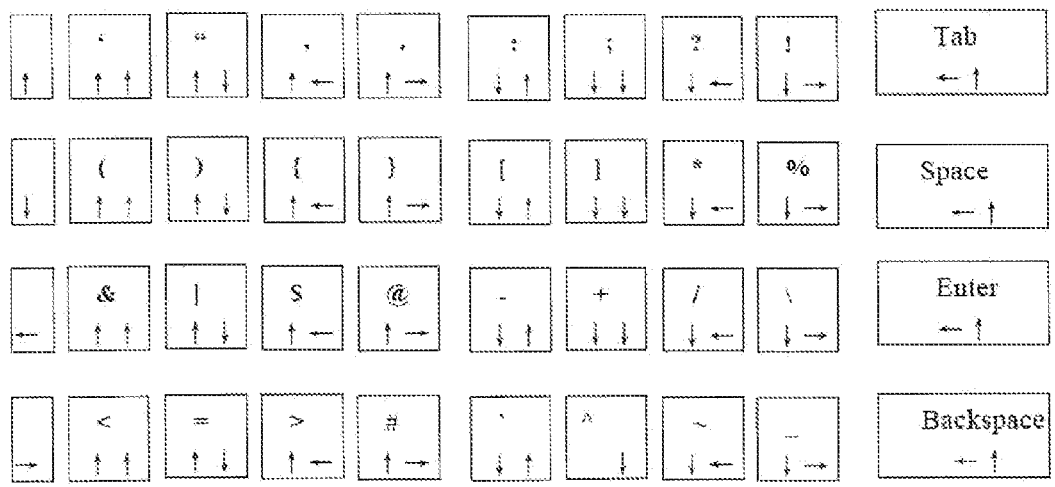
FIG. 6 shows Code Table 3 of the embodiment of the method of the present invention for character input by arrow keys.

See the code tables of the embodiment of the method of the present invention as illustrated in FIG. 4-FIG. 6. 95 visible characters of ASCII code table can be divided into three code tables, and they can be switched by using "+/−" bidirectional keys of electronic devices as code table selection keys. The code table 1 as illustrated in FIG. 4 show the total of 39 characters, specifically, that are 26 lowercases, 10 numbers (0-9), Space, Tab and Backspace. The relative positions of them are largely consistent with that in the standard keyboard. The code table 2 includes a total of 39 characters, specifically, that are 26 uppercases, 10 numbers (0-9), Space, Tab and Backspace. The code table 3 includes a total of 36 characters, specifically, that are 32 common punctuations, Enter, Space, Tab and Backspace. In the embodiment, the number of arrow keys (left, right, up and down) is four, and the number of keystrokes of arrow keys is K=3, $m^K$=64 is greater than the number of characters of every code table. All of the mentioned can guarantee every character can be expressed by the sequence S of the arrow keys input with three keys.

In every code table, every character is expressed by three arrow keys. For characters in every line, as shown in FIG. 4-6, its first arrow key is the arrow key within the first rectangle. And each of other rectangles contains two parts: the upper part is the character and the bottom part is the rest two arrow keys. There are 3 arrow keys in total. The characters of arrow keys are arranged in the order of "left, right, up and down". There are 4 lines in every code table, and the first arrow keys of the characters in each line correspond to the four arrow keys of "left, right, up and down" respectively. Every four characters in each line can be grouped into one group, and each line can be divided into several groups, wherein each group of second arrow keys corresponds to the four arrow keys of "left, right, up and down" orderly. Each group contains 4 characters, and the third arrow keys of each group correspond to the four arrow keys of "left, right, up and down" respectively.

See the following from Table 1 to Table 3, which respectively illustrates the code values of corresponding characters in the three code tables of the preferable embodiment of the present invention. A simple and direct method to establish a mapping relationship between the sequence S of arrow keys input and the characters in the code table is to establish a one-to-one mapping relationship from the sequence S of arrow keys input to the code value of each character in the code table. This mapping relationship can be constructed depending on every code table, and those skilled in the art can build a variety of mapping relations and mapping algorithms according to the mathematical common knowledge. Alternatively, the position of the prompt message of every character in the code table can be taken into consideration for setting the code of the Character in the code table. In this way, the characters in different code tables will correspond to the same sequences of keys, as long as the characters are displayed in the same position of the prompt message. This method not only facilitates users to input sequences of keys in a familiar way, but also, facilitates different code table to use the same mapping formula. It brings convenience to programming.

TABLE 1

Mapping table between a character and its code value in code table 1

| Character | Code Value |
|---|---|
| 1 | 0 |
| 2 | 1 |
| 3 | 2 |
| 4 | 3 |
| 5 | 4 |
| 6 | 5 |
| 7 | 6 |
| 8 | 7 |
| 9 | 8 |
| 0 | 9 |
| q | 10 |
| w | 11 |
| e | 12 |
| r | 13 |
| t | 14 |
| y | 15 |
| u | 16 |
| i | 17 |
| o | 18 |
| p | 19 |
| a | 20 |
| s | 21 |
| d | 22 |
| f | 23 |
| g | 24 |
| h | 25 |
| j | 26 |
| k | 27 |
| l | 28 |
| Tab | 29 |
| z | 30 |
| x | 31 |
| c | 32 |
| v | 33 |
| b | 34 |
| n | 35 |
| m | 36 |
| Space | 37 |
| Backspace | 38 |

TABLE 2

Mapping table between a character and its code value in code table 2

| Character | Code Value |
|---|---|
| 1 | 0 |
| 2 | 1 |
| 3 | 2 |
| 4 | 3 |
| 5 | 4 |
| 6 | 5 |
| 7 | 6 |
| 8 | 7 |
| 9 | 8 |
| 0 | 9 |
| Q | 110 |
| W | 111 |
| E | 112 |
| R | 113 |
| T | 114 |
| Y | 115 |
| U | 116 |
| I | 117 |
| O | 118 |
| P | 119 |
| A | 120 |
| S | 121 |
| D | 122 |
| F | 123 |
| G | 124 |
| H | 125 |
| J | 126 |
| K | 127 |
| L | 128 |
| Tab | 129 |
| Z | 130 |
| X | 131 |
| C | 132 |
| V | 133 |
| B | 134 |
| N | 135 |
| M | 136 |
| Space | 137 |
| Backspace | 138 |

TABLE 3

Mapping table between a character and its code value in code table 3

| Character | Code Value |
|---|---|
| ' | 50 |
| " | 51 |
| , | 52 |
| . | 53 |
| : | 54 |
| ; | 55 |
| ? | 56 |
| ! | 57 |
| Tab | 58 |
| ( | 59 |
| ) | 60 |
| { | 61 |
| } | 62 |
| [ | 63 |
| ] | 64 |
| * | 65 |
| % | 66 |
| Space | 67 |
| & | 68 |
| \| | 69 |
| $ | 70 |
| @ | 71 |
| - | 72 |
| + | 73 |
| / | 74 |
| \ | 75 |
| Enter | 76 |
| < | 77 |
| = | 78 |
| > | 79 |
| # | 80 |
| ` | 81 |
| ^ | 82 |
| ~ | 83 |
| _ | 84 |
| Backspace | 85 |

The mapping relationship can be represented by an explicit formula such as C=F(S) For multiple code tables, the code value C is possibly related to the serial number A of the code table, i.e. C=F(S, A). If it isn't represented by an explicit formula, it will work if the mapping relationship between the sequences S of arrow keys in the above code table and the code values C of the characters is directly saved to a mapping table, and then this mapping table is looked up to map both of them. In general, the representing method of an explicit formula is more effective than looking up the mapping table, especially when the formula is for linear operation, e.g., it is a vector multiplication in the embodiment. The more characters in total, the more obvious of the advantage, and the effect resulted from the code table design and the choice of the mapping relationship will be more important.

To increase efficiency, you can establish a linear formula to represent the corresponding relationship. For example, assuming the assignment of sequence of keys to input as S=[S1, S2, S3 ], assuming the serial number of the code table as A=a, and the linear coefficient of Table 1 as: B=[b(a), b1, b2, b3], and then the code values C of the characters in Table 1 can be represented as:

$$C=[A,S] \times B^T = b(a)a + b1.S1 + b2.S3 + b3.S3$$

It is very convenient and effective to calculate the code values.

For this above example, assign the key Up↑, Down↓, Left←, and Right→ respectively as 0, 1, 2, and 3. Take Table 1 for example, assign a=1, b(1)=0, b1=10, b2=4, b3=1. It is a segmented linear mapping in Table 2, i.e. a=2, and then it needs to execute a simple judgment: if S1=0, b(2)=0; if S1≠0, b(2)=100; while b1=10, b2=4, b3=1 will be the same as that in Table 1 and won't be changed. Alternatively, assign the digital characters 1-9 and 0 in Table 2 as 100-109 respectively, and then the step to determine the S1 value is unnecessary and you can directly set b(2)=100. For Table 3, assign a=3, and then b(3)=50, while b1=10, b2≤4, b3=1 are the same as that in Table 1 and Table 2.

There are many different specific methods to realize the method for character input by arrow keys as shown in FIG. 3. In the following, we will combine FIGS. 7A & 7B with FIGS. 8A & 8B to introduce the procedures according to two embodiments of the input method of the present invention.

Figure 10:
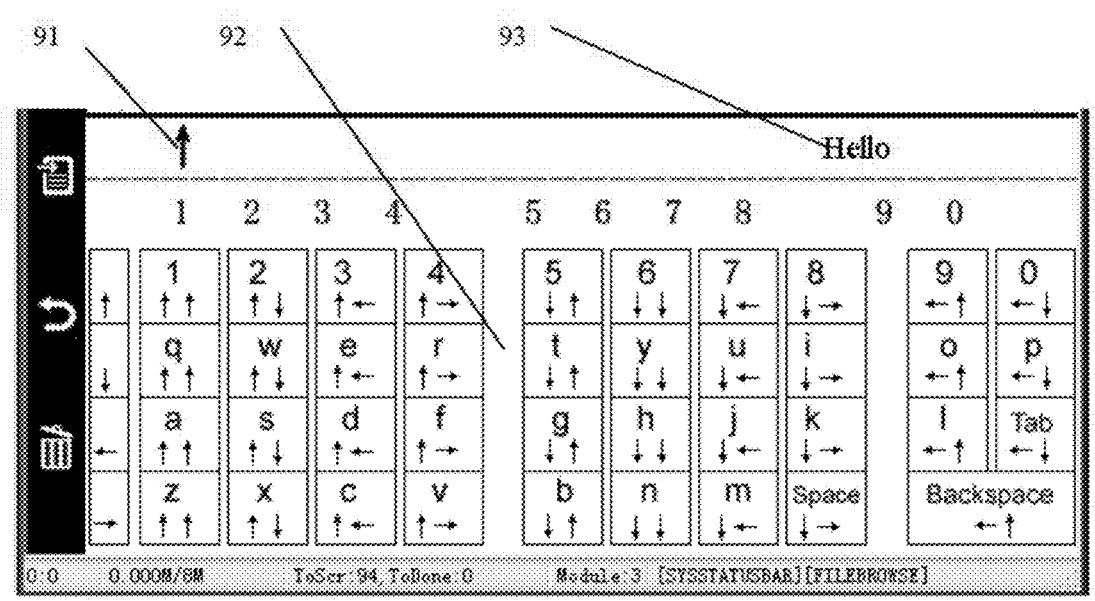
FIG. 10 is a display interface illustrating an embodiment of the present invention.

See FIG. 10, in the state for character input, the on-screen display area of the display screen has a prompt area 92 of at least one code table and one dynamic prompt box 91. The prompt area 92 of the code table shows the prompt message of the code table as the code tables shown in FIG. 4-6; the dynamic prompt box 91 dynamically shows the current key input of the sequence of arrow keys that have been input. Preferably, the prompt area of the code table has a dynamic cursor that can indicate the current character to facilitate the users to confirm. Generally speaking, as shown in FIG. 10, the on-screen display area further at the same time has an input record area 93 that can show the characters that already have been input.

FIG. 7 are flow charts for the input methods that only apply to inputting characters by code table selection keys, arrow keys and a confirmation key. In the state for character input, firstly detect whether there is any new key input (Step 705), if yes, continue, if no, return to wait. Wherein, the way to detect the input of the next key in the step of 705 is adopting the form of cyclic query as an example. Of course, the form of interruption can also work. When any key is input, firstly determine whether it is a code table selection key input (Step 710), such as "+/−" and Page Up/Down keys. If yes, switch the current code table according to the input (Step 715), and switch the display to the prompt message of the current code table (Step 720), users can continuously switch the code table until the expected code table is displayed on the screen. Generally speaking, switching the code tables clearly means that the input of the character expected by the users are not in the current code table, however, the current sequence S of arrow keys input is aimed at the current code table, so it helped reduce the keystrokes to clear up the sequence S of arrow keys input while switching the code tables. Of course, if users mainly input uppercase and lowercase letters, and when the sequences of keys corresponding to the uppercase and the lowercase of the same letter are identical in different code tables (such as code table 1 & 2 as shown in FIGS. 4, 5), it can also been assumed that S will not be cleared up while switching between the code tables, so as to facilitate the operation. In accordance with the general custom, if none of the arrow keys is input, the first character of the current code table is set as the default character, and is displayed as the current character, (For example, the current character can be highlighted when the cursor prompts; alternatively, the current character can be displayed in the dynamic prompt box, and so on.) Moreover, the character most frequently used in the current code table can be set as the default character; alternatively, the character recently input can be set as the default character.

After users select a current code table, it is determined to be no in the step of 710, then determine whether the confirmation key is input (Step 725), if yes, confirm the "current character" is the character input (go to step 760), which occurs when the default character of the code table is taken as the character input or the expected character is afforded by the input of the arrow keys; if it is not of the confirmation key, then determine whether an arrow key is input (step 730); if it is not of an arrow key either, execute the corresponding functions of the current key (go to step 755). This step is set to enrich the method of this invention for other keys except code table selection keys, a confirmation key and arrow keys In the occasion When there are only the above three kinds of keys and there are not other keys except them, there could be no such a branching step in the flow chart. Generally speaking, the "other keys" frequently used include the removal key (delete) or the exit key (esc), which may be used to delete the arrow keys or the character recently input; and they could further include other function keys of the electronic devices, which are independent of the character input. After the step of 755, return to the step of 705.

When in the step of 730 the input is determined to be of an arrow key, continue to recognize the arrow key, and identify it is which arrow key (Step 735). For example, assign the key-values for the four arrow keys respectively as Kn(n=1, 2, 3, 4) and get the key-value Kn in this step.

After that, update the sequence S of arrow keys input according to the key-value Kn (Step 740). A simple way to update is adding the key-value Kn to the end of sequence S. According to the given keystroke k of arrow keys to input each character of the method. A simple judgment can be made in this step for example, when the given value is k=3, i.e., when a character is determined by 3 arrow keys, and if the sequence S is saturated by having 3 valid keys input, the length of the sequence S would not further increased. Alternatively, another judgment could be setup by replacing the last arrow key in the sequence by the arrow key input when the sequence of arrow keys in the current sequence S is invalid.

Wherein, the so-called "valid" or "invalid" of the sequence S of arrow keys input, means that whether there is a character possibly matched with the sequence S in the current code table. For example, assign the key-values for the four arrow keys "Up, Down, Left, Right", respectively as 0, 1, 2, 3. For code table 1 as shown in FIG. 4, the sequence (3, 0, 0) which corresponds to the character "z" is valid; however, the sequence (3, 2, 3) is invalid because there is no character corresponding to it. For another example, the sequence (2, 2) is valid because (2, 2, *) may corresponds to a character and "*" represents any key-value; but the sequence. (2, 3) is invalid because it is impossible for (2, 3, *) to correspond to any character. If the number of the elements in sequence S of arrow keys input is equal to the given keystrokes k and the sequence is valid, the sequence S of arrow keys input is called to be saturated.

Next, determine the input code value C according to the sequence S of the arrow keys input (step 745). The code value C is calculated according to the mapping relationship $\Re$ (S, C) S→C constructed between the sequence S of the arrow keys input and the encoded value C of the character in the preset current code table. If $\Re$ (S, C) S→C only refers to the mapping relationship between the saturated sequence and the encoded value of the character, the unsaturated sequence S can be filled up. For example, in this step, the sequence S comprises at least one element. In the unsaturated case, if the sequence S is valid, it means that the number of the elements of the sequence S is less than k, and the vacant elements could be filled up with default values, such as filling, the sequence (2,2) up to the sequence (2,2,0). Of course, it can also be filled up with any arrow key so that the filled sequence is valid. If the sequence S is invalid, it is a direct choice to assign the encoded value of the corresponding character as null. It is to be noted that the so-called "filling up" is just used fix calculating, and will not change the sequence S of arrow keys input that is stored.

The next step, determine the current character according to the code value of the input and the current code table, and display the prompt message of the current character on the display screen (step 750). The character corresponding to the code value C calculated according to the step of 745 is the current character. If the sequence S is invalid, and the corresponding code value is null, the current character can be set as absence, or the default character. Meanwhile, the prompt message of the current character can be displayed on the display screen. For example, when the cursor prompts, the current character can be highlighted; or displayed in the dynamic prompt box, and so on.

After the Step of 750, go back to step 705 and wait for the confirmation key to confirm the current character, in this embodiment, it is taken, as the end of inputting a single character that the current character is confirmed as the character input by the confirmation key, i.e., Each character input should be determined by pressing down the confirmation key. After finishing inputting one character, start inputting the next character, and so on, each of these steps cycles.

Figure 7A:
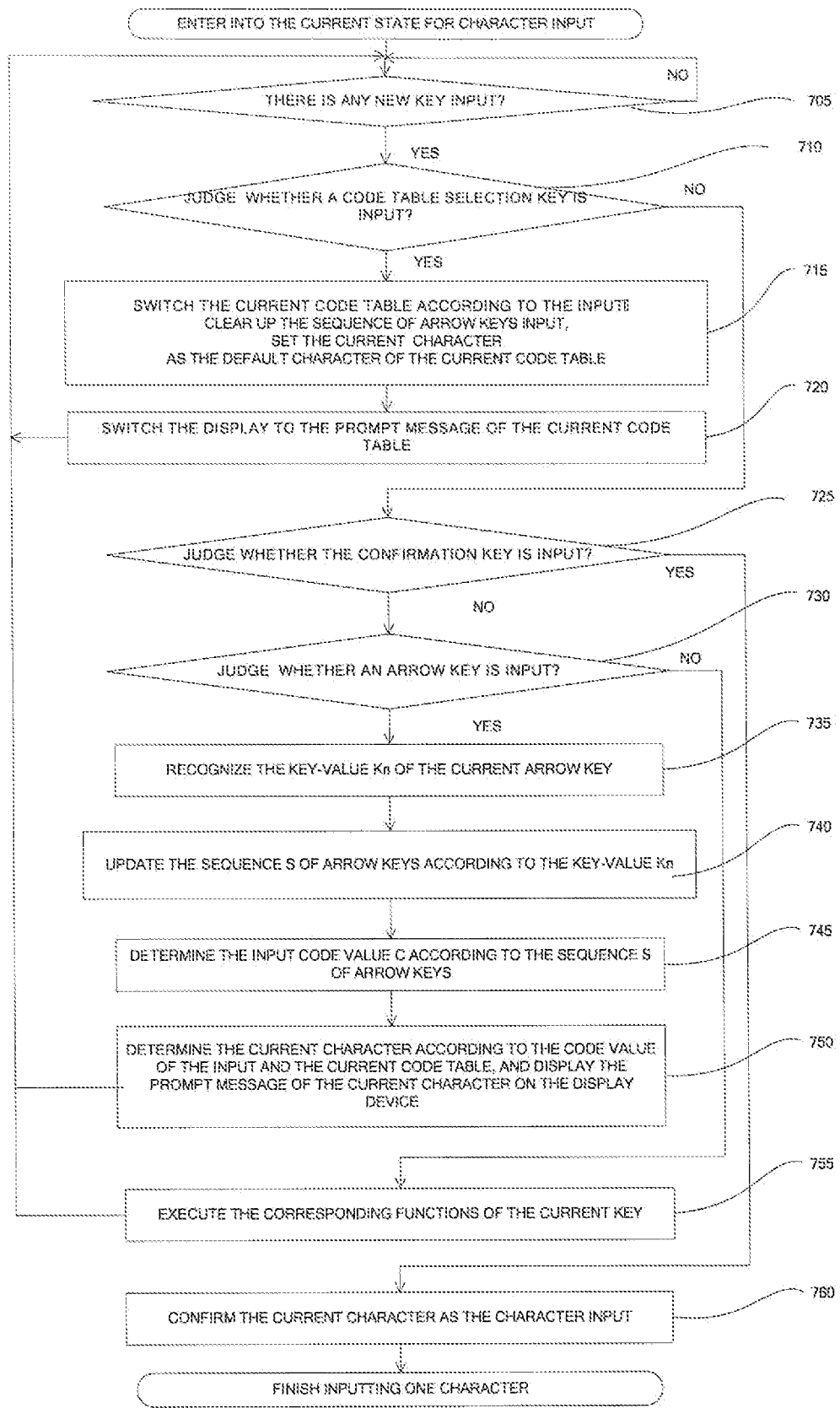
FIGS. 7A, 7B are flow chart views illustrating the Embodiment 1 of the method of the present invention to input a character by arrow keys.
Figure 7B:
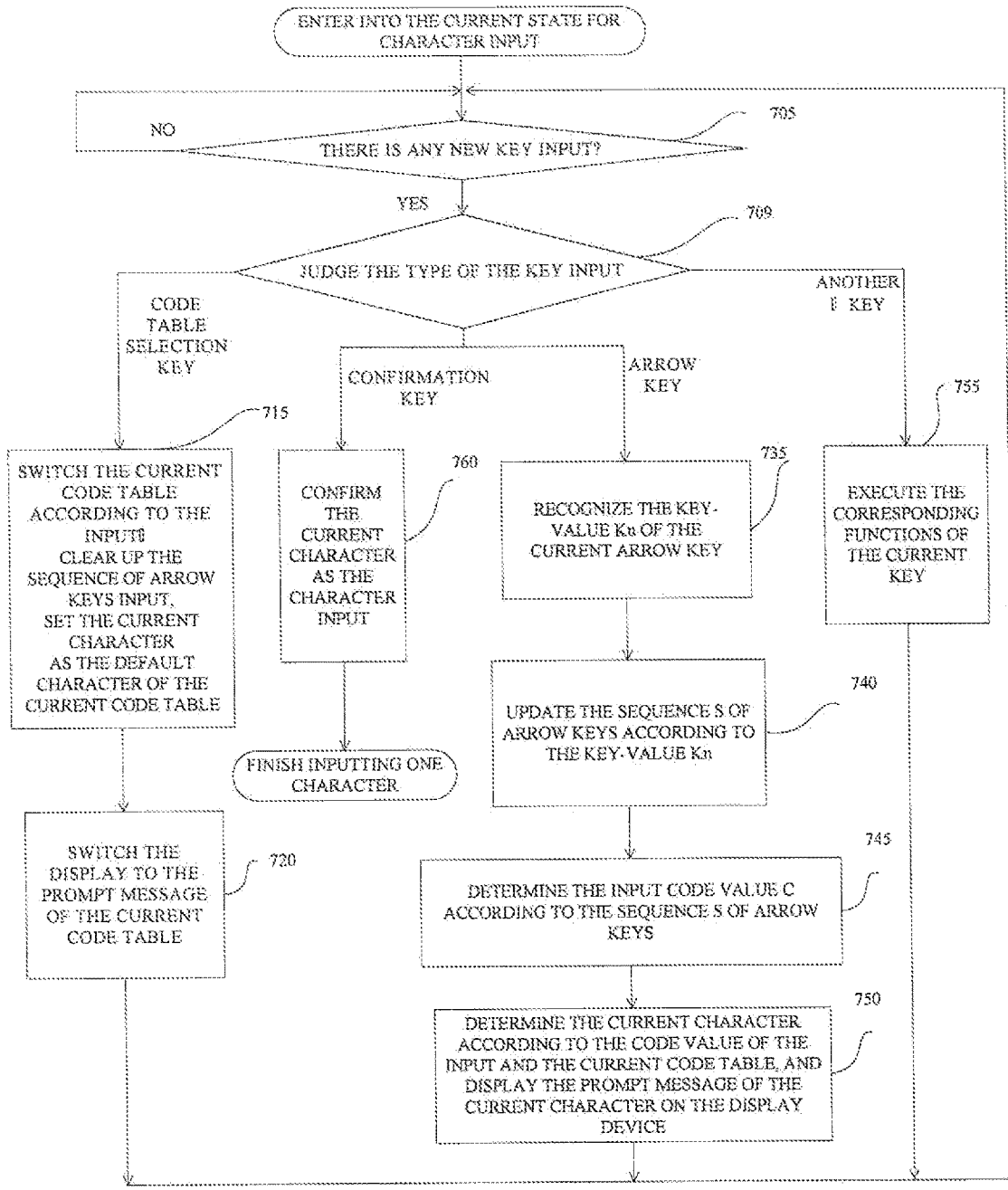

Alternatively, as shown in FIG. 7B, for the key input, after the key input is detected in the step of 705, do not judge the types of the keys "yes or no" one by one, but execute the step of 709 to judge uniformly the types of the keys, i.e., get the types of the keys input, and execute the corresponding operations according to the different types. If it is a code table selection key, execute the step of 715 and 720, and then go back to the step of 705. If it is the confirmation key, execute the step of 760, and then finish inputting the current character. If it is an arrow key, execute the step of 735, 740, 745 and 750 orderly, and then go back to the step of 705 to wait for the next key. If it is another key except the three kinds of keys, execute the step of 755, and then go back to the step of 705. Wherein, the same sign in FIG. 7B represents the same step of operation as that in FIG. 7A, in each step all embodiments that can be used for FIG. 7A can be used for FIG. 7B. In fact, the methods implemented by FIGS. 7A and 7B are essentially the same.

According to the method in the present invention, for the saturated sequence S of arrow keys input, because there are no repeated codes in a single code table, in order to improve the efficiency for inputting, when the sequence S of arrow keys input is saturated the corresponding character can be confirmed directly as the character input thereby reducing the number of keystrokes. The flow charts for the method for the sequence S of arrow keys input to input a character saturatedly are as illustrated in FIGS. 8A and 8B.

Figure 8A:
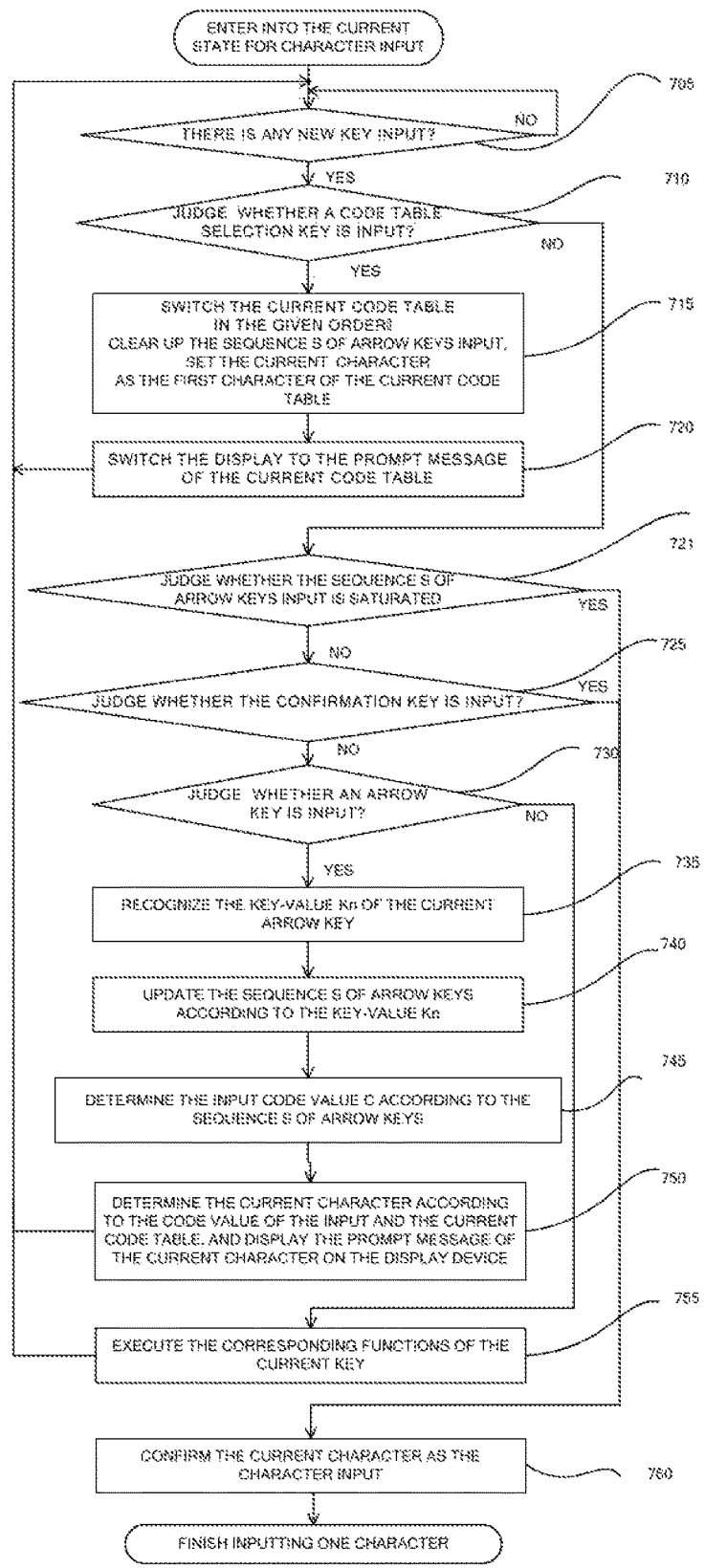
FIGS. 8A, 8B are flow chart views illustrating the Embodiment 2 of the method of the present invention to input a character by arrow keys.

In FIG. 8A, the step with the same Sign executes a similar operation as that in FIG. 7. The difference between the embodiment of FIGS. 8A and 7A is that a step of 721 of judging whether the sequence S of arrow keys input is saturated is added to the embodiment of FIG. 8A. In the embodiment, the step of 721 is added after the step of 710 of judging the input is not a code table selection key and before the step of 725. When in the step 721 it is judged that the sequence S of arrow keys input is saturated, the current character corresponding to the sequence S will be automatically confirmed as the character input by default (jump to step 760) and thus finish inputting one character. When the sequence S of arrow keys input is unsaturated, continue to the step of 725. Actually, in the embodiment, the step of 721 can be put at any location after the step of 740 of updating the sequence S of arrow keys input and before the step of 750.

Figure 8B:
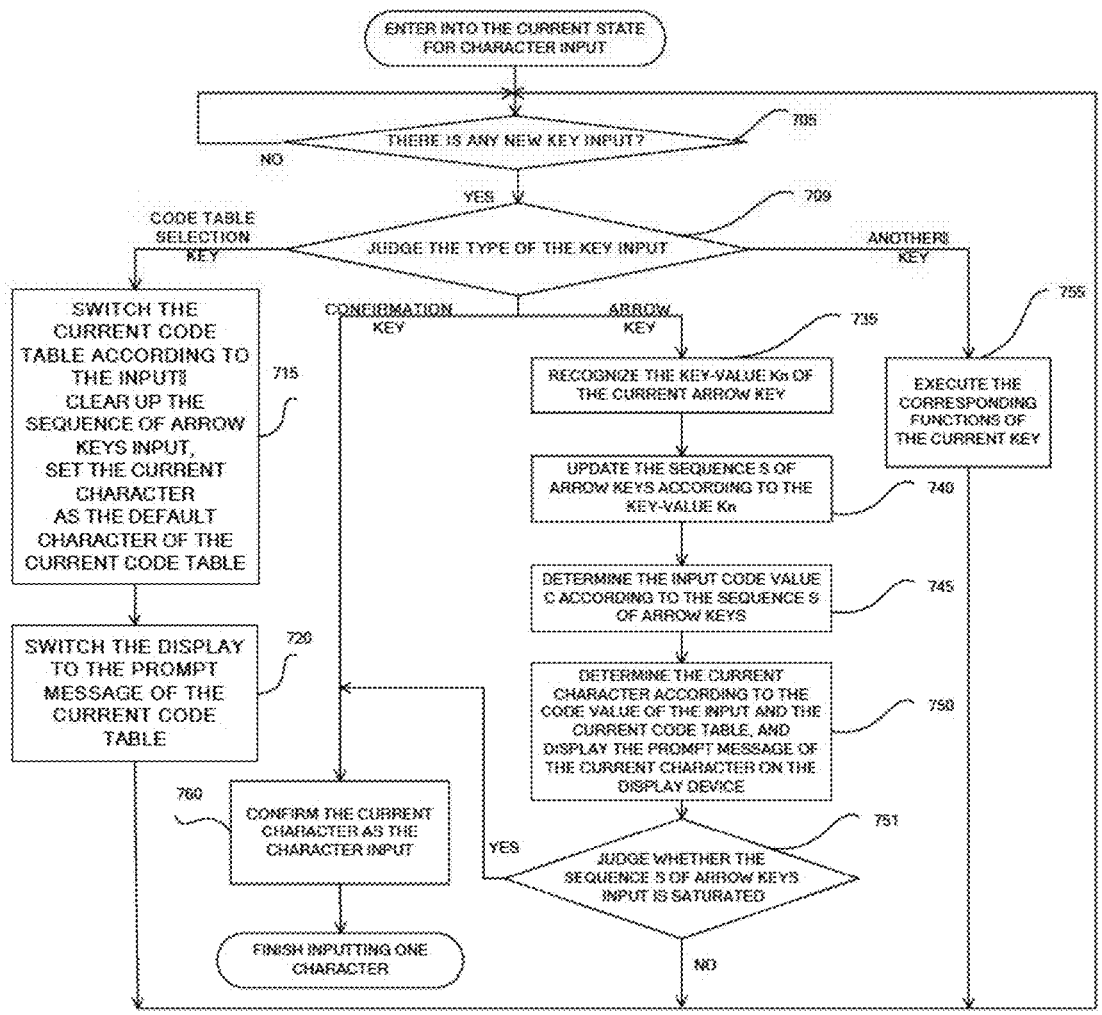

Alternatively, as shown in FIG. 8B, for the key input, after the key input is detected in the step of 705, do not judge the types of the keys "yes or no" one by one, but execute the step of 709 to judge uniformly the types of the keys, i.e., get the types of the keys input, and execute the corresponding operations according to the different types. If it is a code table selection key, execute the step of 715 and 720, and then go back to the step of 705. If it is the confirmation key, execute the step of 760, and then finish inputting the current character. If it is an arrow key, execute the step of 735, 740, 745 and 750 orderly, and then go to the step of 751 of judging whether the sequence S of arrow keys input is saturated. If it is saturated, then go to the step of 760; if it is unsaturated, then go back to the step of 705 and wait for the next key; if it is another key except the above three kinds of keys, execute the step of 755, and then go back to the step of 705.

Wherein, the same sign in FIG. 8B represents the same step of operation as that in FIG. 8A, in each step all embodiments that can be used for FIG. 8A can be used for FIG. 8B. In fact, the methods implemented by FIGS. 8A and 8B are essentially the same.

To exit the state for character input, it can be implemented by using the confirmation key or setting a separate "exit' key as the exit trigger. When using the confirmation key as the exit trigger, it can be set that when sequence S the arrow keys input is null, do not set the default character of the current code table as the current character, but assign the current character as null. Thus, pressing the confirmation, key does not correspond to confirming the character input, but to entering into the state of the menu. Select to exit the state for character input by selecting the menu. These can be set by those skilled in the art according to the actual situation of the electronic devices applied by the method of the present invention.

It is to be noted that the protection scope of the claims of the input device and method to input by arrow keys of the present invention extends to all the electronic apparatus using the input device and method, including implementing the method in the form of any hardware or software, including but not limited to implementing the method by any form of computer language programs or compiled programs running on any operating system platform, computer language program or the compiled program to implement the method, as well as implementing it in any form of hardware.

The above description about the present invention is illustrative but not restrictive. Those skilled in the art can modify, change or do some equivalent operations within the spirit and scope limited by the claims without departure from the protection scope of the present invention.

What is claimed is:

1. A method for character input by arrow keys, wherein, a mapping relationship between characters in an input character set and a sequence of arrow keys input is constructed, and at least one code table is established to indicate said mapping relationship; a character is input by code table selection keys and arrow keys, the method comprising:
   determining a current code table according to the input of the code table selection keys;
   displaying a prompt message of the current code table on a display screen; displaying characters that have already been input on the display screen; and displaying a current key input of the sequence of arrow keys that have been input on the display screen;
   determining the character input in the current code table according to the sequence of arrow keys input;
   wherein, the mapping relationship between the characters in the input character set and the sequence of arrow keys input is that: the characters in the input character set is distributed over every code table; that every character in every code table is assigned a different code value C; that for every code table, different sequence of arrow keys input is mapped with a different code value C, wherein the code value C is a number;
   wherein, a corresponding relationship between the sequence of arrow keys, a vector S=(S1, S2, . . . , Sn), input and the code value C in every code table is:
   if an i-th arrow key is assigned a key-value Si, a row vector S that consist of key-values of the keys in the sequence of arrow keys input has a linear relationship with the code value C: $C=S \times B^T$, wherein B is a coefficient vector of a corresponding dimension, and a superscript "T" represents "transpose".

2. The method as claimed in claim 1, wherein, the step of determining the character input in the current code table further comprising:
   selecting a current character in the current code table according to the sequence of arrow keys input;
   judging whether a selecting condition is satisfied; If yes, going forward to a step of confirming the current character as the character input; if no, going back to the step of selecting a current character in the current code table;
   confirming the current character as the character input.

3. The method as claimed in claim 2, wherein, a selecting condition is that the sequence of arrow keys input is saturated; wherein the "saturated" means that the sequence of arrow keys input already reaches the given length and the sequence of arrow keys input has a corresponding character in the current code table.

4. The method as claimed in claim 2, wherein, the method further comprises using a confirmation key and taking pressing the confirmation key down as a selecting condition in the step of judging.

5. The method as claimed in claim 1. wherein, a number of the arrow keys is 4.

6. The method as claimed in claim 5, wherein, a maximum length of the sequence of arrow keys input is 3.

7. A method for character input by arrow keys, wherein, a mapping relationship between characters in an input character set and a sequence of arrow keys input is constructed, and at least one code table is established to indicate said mapping relationship; a characters is input by code table selection keys, arrow keys and a confirmation key, the method for character input comprising:
   detecting whether there is any new key input; if no, keeping on waiting; if yes, going to a next step of judging a type of the key input;
   judging a type of the key input and executing the following operations respectively according to the type:
   when code table selection keys are input, switching a current code table according to the key input, and controlling a display screen to display a prompt message of the current code table, then going back to the step of detecting whether there is any new key input;
   when an arrow key is input, recognizing a key-value of the arrow key input and updating the sequence of arrow keys input accordingly; displaying characters that have already been input on the display screen; and displaying a current key input of the sequence of arrow keys that have been input on the display screen; selecting a current character in the current code table according to the sequence of arrow keys input, and then going back to the step of detecting whether there is any new key input;
   when a confirmation key is input, confirming that the current character is the character input, and going to an end of a process to input a character;
   wherein, the mapping relationship between the characters in the input character set and the sequence of arrow keys input is that: the characters in the input character set is distributed over every code table: that every character in every code table is assigned a different code value C; that for every code table, different sequence of arrow keys input is mapped with a different code value C, wherein the code value C is a number;
   wherein, a corresponding relationship between the sequence of arrow keys, a vector S=(S1, S2 , . . . , Sn), input and the code value C in every code table is:
   if an i-th arrow key is assigned a key-value Si, a row vector S that consist of key-values of the keys in the sequence of arrow keys input has a linear relationship with the code value C: $C=S \times B^T$, wherein B is a coefficient vector of a corresponding dimension, and above superscript "T" represents "transpose".

8. The method as claimed in claim 7, wherein, in the step of judging the type of the key input; when an arrow key is input, the method further comprising a step of judging whether the sequence of arrow keys input is saturated after updating the sequence of arrow keys input and determining the current character; if no going back to detecting whether there is any new key input; if yes, confirming that the current character is the character input and finish inputting one character;
   wherein "saturated" means that the sequence of arrow keys input reaches a given length and the sequence of arrow keys input has a corresponding character in the current code table.

9. The method as claimed in claim 7, wherein, a number of the arrow keys is 4.

10. The method as claimed claim 9, wherein, the sequence of arrow keys input has at most 3 elements.

11. The method as claimed in claim 10, wherein, a length of the sequence of arrow keys input is 3.

12. A device for character input by arrow keys comprising a character input module and a group of keys input, a display screen and a memory that communicate with the character input module, wherein:

the group of keys input comprising at least one code table selection key, a plurality of arrow keys and at least one confirmation key; a content to control the display screen and the character input module to execute the following steps is stored in the memory:

confirming a current code table according to the input of the code table selection key; displaying a prompt message of the current code table on the display screen; and displaying a current key input of the sequence of arrow keys that have been input on the display screen; confirming the character input in the current code table according to a sequence of arrow keys input; and a mapping relationship between a characters in an input character set and the sequence of arrow keys input and at least one code table to indicate said mapping relationship are stored in the memory, characters in the input character set is distributed over every code table; that every character in every code table is assigned a different code value C, that different sequence of arrow keys input is mapped with the different code value C, wherein the code value C is a number; and a corresponding relationship between the sequence of arrow keys, a vector $S=(S1, S2 \ldots Sn)$ input and the code value C in every code table is: if an i-th arrow key is assigned of arrow keys input has a linear relationship with the code value C: $C=S \times B^T$, wherein B is a coefficient vector of a corresponding dimension, and a superscript "T" represents "transpose.

13. The device for character input by arrow keys as claimed in claim 12, wherein, the character input module comprising:

a key recognition unit for receiving the key input and recognize which key is pressed; an input judgment unit for judging a type of the key input;

an analysis processing unit for executing the corresponding operation according to the type of the key input;

wherein, when a code table selection key is input, the current code table is switched according to the key input and the prompt message of the current code table is sent to a display control unit; when an arrow key is input, the key-value of the arrow key input is recognized, the sequence of arrow keys input is hereby updated and a current character is determined in the current code table according to the sequence of arrow keys input; when a continuation key is input, it is confirmed that the current character is the character input, and the character input is sent to a character input temporary memory unit;

the display control unit for controlling the display screen to display correspondingly according to the received message; and the character input temporary memory unit for storing the confirmed character input.

* * * * *